US012101033B2

United States Patent
Wang et al.

(10) Patent No.: US 12,101,033 B2
(45) Date of Patent: Sep. 24, 2024

(54) ASYMMETRICAL HALF-BRIDGE FLYBACK AND CONTROL METHOD

(71) Applicant: Huawei Digital Power Technologies Co., Ltd., Shenzhen (CN)

(72) Inventors: Lei Wang, Shenzhen (CN); Liang Wu, Dongguan (CN); Zuwei He, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 233 days.

(21) Appl. No.: 17/853,479

(22) Filed: Jun. 29, 2022

(65) Prior Publication Data

US 2023/0020390 A1 Jan. 19, 2023

(30) Foreign Application Priority Data

Jun. 30, 2021 (CN) .......................... 202110741316.6

(51) Int. Cl.
*H02M 3/335* (2006.01)
*H02M 1/00* (2006.01)
*H02M 3/00* (2006.01)

(52) U.S. Cl.
CPC ..... *H02M 3/33571* (2021.05); *H02M 1/0058* (2021.05); *H02M 3/01* (2021.05); *H02M 3/33569* (2013.01); *H02M 3/33576* (2013.01)

(58) Field of Classification Search
CPC .. H02M 3/33571; H02M 3/3353; H02M 3/01; H02M 1/0058; H02M 3/33576;
(Continued)

(56) References Cited

U.S. PATENT DOCUMENTS

| 9,112,418 B2 | 8/2015 | Chen |
| 2012/0106215 A1 | 5/2012 | Chia |

(Continued)

FOREIGN PATENT DOCUMENTS

| CN | 103856079 A | 6/2014 |
| CN | 107979264 A | 5/2018 |
| CN | 112582982 A | 3/2021 |

OTHER PUBLICATIONS

Medina-Garcia et al., "Advanced Control Methods for Asymmetrical Half-Bridge Flyback," IEEE Transactions on Power Electronics, vol. 36, No. 11, pp. 13139-13148, Institute of Electrical and Electronics Engineers, New York, New York (Nov. 2021).

*Primary Examiner* — Alex Torres-Rivera
(74) *Attorney, Agent, or Firm* — Leydig, Voit & Mayer, Ltd.

(57) ABSTRACT

This application provides a switching conversion circuit, including: a power module, supplying power to a switching conversion module and an integrated circuit (IC) controller; and the switching conversion module is an asymmetrical half-bridge flyback structure and includes at least a first switching transistor, a second switching transistor, a first capacitor, and a transformer. The transformer includes a first secondary-side winding and a second secondary-side winding, and the first secondary-side winding of the transformer is coupled to a load. The IC controller turns on the first switching transistor or the second switching transistor based on a value of a first voltage, so that the switching conversion module enters an operating state to supply power to the load; and turns off the first switching transistor and the second switching transistor based on a value of a second voltage, so that the switching conversion module stops supplying power to the load.

13 Claims, 5 Drawing Sheets

(58) Field of Classification Search
CPC ......... H02M 3/33592; H02M 3/33569; H02M 1/0032; H02M 1/32
See application file for complete search history.

(56) References Cited

U.S. PATENT DOCUMENTS

| | | | |
|---|---|---|---|
| 2014/0376275 A1* | 12/2014 | Ohashi | H02M 3/33523 363/21.02 |
| 2015/0023070 A1 | 1/2015 | Nate | |
| 2015/0091460 A1* | 4/2015 | Kato | H02M 1/36 361/18 |
| 2015/0155787 A1 | 6/2015 | Chen | |
| 2018/0337606 A1* | 11/2018 | Ausseresse | H02M 3/33507 |
| 2020/0036290 A1* | 1/2020 | Yang | H02M 3/24 |
| 2020/0127571 A1 | 4/2020 | Matsuda et al. | |
| 2021/0057989 A1* | 2/2021 | Jang | H04N 5/63 |
| 2022/0200476 A1* | 6/2022 | Ahmed | H02M 3/33576 |

\* cited by examiner

ASYMMETRICAL HALF-BRIDGE FLYBACK AND CONTROL METHOD

CROSS-REFERENCE TO RELATED APPLICATIONS

This application claims priority to Chinese Patent Application No. 202110741316.6, filed on Jun. 30, 2021, which is hereby incorporated by reference in its entirety.

TECHNICAL FIELD

This application relates to the field of power supply technologies, and in particular to a switching conversion circuit and a control method.

BACKGROUND

With deepening of energy saving, requirements of international standards for features such as efficiency of power supply products are becoming increasingly higher. A switch mode power supply usually needs to determine an operating state of the power supply based on a voltage on an input side, that is, a brown in/out function. Brown in refers to turning on a circuit when the voltage on the input side of the power supply reaches a specified operable voltage threshold. Brown out refers to turning off the circuit when the voltage on the input side of the power supply is lower than the specified operable voltage threshold.

Brown in/out is actually used to control the circuit to turn on and off, which can protect the circuit when the input voltage is extremely low. An effective and fast implementation of the brown in/out function is a basic feature of the switch mode power supply.

It is very easy to implement the brown in/out function after a specific value of the voltage on the input side is known. However, for a power controller, when a working voltage is detected to output a control instruction to perform brown in/out control, it is expected to reduce a quantity of pins and peripheral circuits as much as possible. Therefore, a switching conversion circuit and a control method are urgently needed, so that the brown in/out function can still be implemented without adding an additional input voltage detection pin.

SUMMARY

To resolve the foregoing problem, embodiments of this application provide a switching conversion circuit and a control method.

According to a first aspect, an embodiment of this application provides a switching conversion circuit, including: a power module, supplying power to a switching conversion module and an integrated circuit (IC) controller; and the switching conversion module is an asymmetrical half-bridge flyback structure and includes at least a first switching transistor, a second switching transistor, a first capacitor, and a transformer. The first switching transistor and the second switching transistor are connected in series at both terminals of the power module. A primary-side winding of the transformer is coupled at both terminals of the first switching transistor by using the first capacitor. The transformer includes a first secondary-side winding and a second secondary-side winding, and the first secondary-side winding of the transformer is coupled to a load. The IC controller turns on the first switching transistor or the second switching transistor based on a value of a first voltage output by a first detection terminal, so that the switching conversion module enters an operating state to supply power to the load; and turns off the first switching transistor and the second switching transistor based on a value of a second voltage output by a second detection terminal, so that the switching conversion module stops supplying power to the load. The value of the first voltage is a value of a voltage input from an alternating current power supply side. The value of the second voltage is a value of a voltage output by the second secondary-side winding of the transformer. The switching conversion circuit provided in this embodiment of this application does not need to add an additional monitoring circuit to detect a working voltage of a direct current bus in the switching conversion module, but multiplexes two pins in the circuit, to implement a control function of brown in/out while performing functions such as power supplying and ZVS. This simplifies a quantity of peripheral circuits and output terminals of the switching conversion module, reduces a quantity of pins detected by the IC controller, and reduces system costs.

In a possible implementation, the switching conversion circuit further includes: a first detection unit, coupled between a first input terminal and a second input terminal of the power module, where a first detection terminal of the first detection unit is coupled to the IC controller, and is configured to detect the first voltage and a third voltage; and a second detection unit, coupled at both terminals of the second secondary-side winding of the transformer, where a second detection terminal of the second detection unit is coupled to the IC controller, and is configured to detect the second voltage.

In a possible implementation, the IC controller is configured to: before the switching conversion module enters the operating state, detect a value of the first voltage output by the first detection terminal; and when the value of the first voltage reaches a first threshold, output a first control instruction, to turn on the first switching transistor or the second switching transistor, so that the switching conversion module enters the operating state to supply power to the load. The first threshold is a specified lowest input voltage value for entering normal operation. In this way, the control function of brown in can be implemented by time-division multiplexing pins in the circuit while a function, such as power supplying, is performed, and the quantity of peripheral circuits and output terminals of the switching conversion module is reduced.

In a possible implementation, the value of the second voltage includes a first value and a second value. The IC controller is configured to detect, in an operating state in which the first switching transistor is turned on and the second switching transistor is turned off, a value of the second voltage output by the second detection terminal to obtain the first value: detect, in an operating state in which the first switching transistor is turned off and the second switching transistor is turned on, a value of the second voltage output by the second detection terminal to obtain the second value: obtain a value of a direct current bus voltage in the asymmetrical half-bridge flyback circuit based on the first value, the second value, and a ratio of a quantity of turns of the primary-side winding to a quantity of turns of the second secondary-side winding; and when the value of the direct current bus voltage is less than a second threshold, output a second control instruction, to turn off the first switching transistor and the second switching transistor, where the second threshold is a specified voltage value for exiting normal operation. In this way, the control function of brown out can be implemented by time-division multiplexing the pins in the circuit while a function, such as ZVS, is performed, and the quantity of peripheral circuits and output terminals of the switching conversion module is reduced.

In a possible implementation, after the switching conversion module enters the operating state, the IC controller is configured to turn off the first switching transistor and the second switching transistor based on a value of the third voltage output by the first detection terminal, so that the switching conversion module stops supplying power to the load. In this way, the control function of brown out may be implemented based on detection of an output voltage of the first detection terminal when an accuracy requirement of a voltage value for exiting normal operation is not high.

In a possible implementation, the IC controller is configured to detect a value of the third voltage output by the first detection terminal; and when the value of the third voltage is less than a second threshold, output a second control instruction, to turn off the first switching transistor and the second switching transistor, where the second threshold is a specified voltage value for exiting normal operation. In this way, the control function of brown out may be implemented by sending, based on the third voltage output by the first detection terminal, the instruction when the accuracy requirement of the voltage value for exiting normal operation is not high.

In a possible implementation, the primary-side winding of the transformer in the switching conversion module is coupled at both terminals of the second switching transistor by using the first capacitor. In this way, two pins in the circuit can also be multiplexed in an AHB of an upper half-bridge arm, to implement the control function of brown in/out while performing functions such as power supplying and ZVS. This reduces the quantity of peripheral circuits and output terminals of the switching conversion module, reduces the quantity of pins detected by the IC controller, and reduces the system costs.

In a possible implementation, the IC controller is configured to: before the switching conversion module enters the operating state, detect a value of the first voltage output by the first detection terminal; and when the value of the first voltage reaches a first threshold, output a first control instruction, to turn on the second switching transistor or the first switching transistor, so that the switching conversion module enters the operating state to supply power to the load, where the first threshold is a specified lowest input voltage value for entering normal operation, and the value of the first voltage is a value of the alternating current voltage. In this way, pins in the circuit can also be multiplexed in an AHB topological structure of the upper half-bridge arm, to implement the control function of brown in while performing power supplying, so that the quantity of peripheral circuits and output terminals of the switching conversion module is reduced.

In a possible implementation, the value of the second voltage includes a first value and a second value. The IC controller is configured to detect, in an operating state in which the first switching transistor is turned off and the second switching transistor is turned on, a value of the second voltage output by the second detection terminal to obtain the first value; detect, in an operating state in which the first switching transistor is turned on and the second switching transistor is turned off, a value of the second voltage output by the second detection terminal to obtain the second value; obtain a value of a direct current bus voltage in the asymmetrical half-bridge fly back circuit based on the first value, the second value, and a ratio of a quantity of turns of the primary-side winding to a quantity of turns of the second secondary-side winding; and when the value of the direct current bus voltage is less than a second threshold, output a second control instruction, to turn off the first switching transistor and the second switching transistor, where the second threshold is a specified voltage value for exiting normal operation. In this way, pins in the circuit can be adaptively multiplexed in the AHB topological structure of the upper half-bridge arm, to implement the control function of brown out while performing the ZVS function. This reduces the quantity of peripheral circuits and output terminals of the switching conversion module.

In a possible implementation, the second detection unit includes the second secondary-side winding of the transformer. A first terminal of the second secondary-side winding is coupled to an anode of a third diode. A cathode of the third diode is coupled to a first terminal of a third capacitor, and a second terminal of the third capacitor is coupled to a second terminal of the second secondary-side winding and is grounded. The IC controller is coupled at the second detection terminal between the first terminal of the second secondary-side winding and the anode of the third diode. In this way, the IC controller may implement the control function of brown out by detecting the voltage output by the second detection terminal.

In a possible implementation, the IC controller is further configured to perform zero voltage switch (ZVS) control on the switching conversion module by detecting the value of the second voltage output by the second detection terminal. In this way, the ZVS function may be performed by detecting the voltage output by the second detection terminal.

In a possible implementation, the power module includes an alternating current/direct current (AC/DC) conversion circuit, and the AC/DC conversion circuit is a full-wave rectifier structure or a half-wave rectifier structure. In this way, a detection circuit in this application may be further applicable to brown in/out control of the AC/DC conversion circuit with the full-wave rectifier structure or the half-wave rectifier structure.

In a possible implementation, the AC/DC conversion circuit is a full-wave rectifier structure, and includes: a first capacitor, a fourth diode, a fifth diode, a sixth diode, and a seventh diode. A cathode of the fourth diode is connected in series to an anode of the sixth diode, and a first common node after the series connection is connected to a first input terminal of an alternating current power supply. A cathode of the seventh diode is connected in series to an anode of the fifth diode, and a second common node after the series connection is connected to a second input terminal of the alternating current power supply. A cathode of the fifth diode is coupled to a cathode of the first capacitor after being connected in parallel to a cathode of the sixth diode. An anode of the fourth diode is coupled to an anode of the first capacitor and is grounded after being connected in parallel to an anode of the seventh diode. In this way, the detection circuit in this application may further monitor brown in/out control of the AC/DC conversion circuit with the full-wave rectifier structure.

In a possible implementation, the first detection unit includes a first diode and a second diode. An anode of the first diode is coupled to the first input terminal of the power module. An anode of the second diode is coupled to the second input terminal of the power module. A first detection terminal after a cathode of the first diode and a cathode of the second diode are connected in parallel is coupled to the IC controller. In this way, the first detection unit can further detect a voltage output by the power module while providing a function such as power supplying for the IC controller.

According to a second aspect, an embodiment of this application provides a control method implemented based on the switching conversion circuit according to the first aspect. The method includes: turning on a first switching transistor or a second switching transistor based on a value of a first voltage output by a first detection terminal, so that a switching conversion module enters an operating state to supply power to a load, where the value of the first voltage is a value of a voltage input from an alternating current power supply side; and turning off the first switching transistor and the second switching transistor based on a value of a second voltage output by a second detection terminal, so that the switching conversion module stops supplying power to the load, where the value of the second voltage is a value of a voltage output by a second secondary-side winding of a transformer. Beneficial effects thereof are the same as those described above, and are not described again.

In a possible implementation, the turning on a first switching transistor or a second switching transistor based on a value of a first voltage output by a first detection terminal, so that a switching conversion module enters an operating state to supply power to a load includes: before the switching converter enters the operating state, detecting the value of the first voltage output by the first detection terminal; and when the value of the first voltage reaches a first threshold, outputting a first control instruction, to turn on the first switching transistor or the second switching transistor, so that the switching conversion module enters the operating state to supply power to the load, where the first threshold is a specified lowest input voltage value for entering normal operation.

In a possible implementation, the value of the second voltage includes a first value and a second value. The turning off the first switching transistor and the second switching transistor based on a value of a second voltage output by a second detection terminal, so that the switching conversion module stops supplying power to the load includes: detecting, in an operating state in which the first switching transistor is turned on and the second switching transistor is turned off, a value of the second voltage output by the second detection terminal to obtain the first value; detecting, in an operating state in which the first switching transistor is turned off and the second switching transistor is turned on, a value of the second voltage output by the second detection terminal to obtain the second value; obtaining a value of a direct current bus voltage in an asymmetrical half-bridge fly back circuit based on the first value, the second value, and a ratio of a quantity of turns of a primary-side winding to a quantity of turns of the second secondary-side winding; and when the value of the direct current bus voltage is less than a second threshold, outputting a second control instruction, to turn off the first switching transistor and the second switching transistor, where the second threshold is a specified voltage value for exiting normal operation.

In a possible implementation, after the switching conversion module enters the operating state, the first switching transistor and the second switching transistor are turned off based on a value of a third voltage output by the first detection terminal, so that the switching conversion module stops supplying power to the load.

In a possible implementation, the value of the third voltage output by the first detection terminal is detected; and when the value of the third voltage is less than a second threshold, a second control instruction is output, to turn off the first switching transistor and the second switching transistor, where the second threshold is a specified voltage value for exiting normal operation.

In a possible implementation, when a primary-side winding of the transformer in the switching conversion module is coupled at both terminals of the second switching transistor by using a first capacitor, the method includes: before the switching conversion module enters the operating state, detecting a value of the first voltage output by the first detection terminal; and when the value of the first voltage reaches a first threshold, outputting a first control instruction, to turn on the second switching transistor or the first switching transistor, so that the switching conversion module enters the operating state to supply power to the load, where the first threshold is a specified lowest input voltage value for entering normal operation, and the value of the first voltage is a value of an alternating current voltage.

In a possible implementation, the value of the second voltage includes a first value and a second value. When a primary-side winding of the transformer in the switching conversion module is coupled at both terminals of the second switching transistor by using a first capacitor, the method includes: detecting, in an operating state in which the first switching transistor is turned off and the second switching transistor is turned on, a value of the second voltage output by the second detection terminal to obtain the first value; detecting, in an operating state in which the first switching transistor is turned on and the second switching transistor is turned off, a value of the second voltage output by the second detection terminal to obtain the second value; obtaining a value of a direct current bus voltage in an asymmetrical half-bridge fly back circuit based on the first value, the second value, and a ratio of a quantity of turns of the primary-side winding to a quantity of turns of the second secondary-side winding; and when the value of the direct current bus voltage is less than a second threshold, outputting a second control instruction, to turn off the first switching transistor and the second switching transistor, where the second threshold is a specified voltage value for exiting normal operation.

In a possible implementation, the method further includes performing zero voltage switch control on the switching conversion module by using the value of the second voltage output by the second detection terminal.

BRIEF DESCRIPTION OF DRAWINGS

To describe technical solutions of a plurality of embodiments disclosed in the specification more clearly, the following briefly describes the accompanying drawings required for describing the embodiments. Clearly, the accompanying drawings in the following description show merely the plurality of embodiments disclosed in the specification, and a person of ordinary skill in the art may still derive other drawings from these accompanying drawings without creative efforts.

The following briefly describes the accompanying drawings used to describe embodiments or the conventional technology.

FIG. 3 is a state diagram of the AHB topological structure shown in FIG. 2 of this application when a switching transistor $Q_H$ is turned off and a switching transistor $Q_L$ is turned on;

FIG. 8 is a state diagram of a detection circuit with the AHB topological structure in FIG. 6 when a switching transistor $Q_H$ is turned off and a switching transistor $Q_L$ is turned on.

DESCRIPTION OF EMBODIMENTS

In the following descriptions, "some embodiments" involved describe a subset of all possible embodiments. However, it may be understood that, "some embodiments" may be same subsets or different subsets of all possible embodiments, and may be combined with each other without conflict.

In the following descriptions, involved terms, such as "first\second\third" or module A, module B, and module C, are merely used to distinguish between similar objects, and do not represent a specific order of objects. It may be understood that, specific orders or priorities may be interchanged if allowed, so that embodiments of this application described herein may be implemented in an order other than those shown or described herein.

In the following description, reference signs representing steps, such as S110 and S120, do not necessarily indicate that the steps are to be performed in this sequence, and sequences of previous and next steps may be interchanged or performed simultaneously if permitted.

Unless otherwise defined, all technical and scientific terms used in this specification have same meanings as that usually understood by a person skilled in the art of this application. The terms used herein are merely intended to describe the embodiments of this application, and are not intended to limit this application.

The following describes the technical solutions in embodiments of this application with reference to the accompanying drawings in embodiments of this application.

It should be noted that "coupling" described in this application means a direct or indirect connection. For example, a connection between A and B may be a direct connection between A and B, or may be an indirect connection between A and B by using one or more other electrical components. For example, A is directly connected to C, and C is directly connected to B, so that a connection between A and B is implemented by using C.

The foregoing is an example description of a use scenario of the embodiment of this application, and is not exhaustive.

It should be understood that a switching conversion circuit and a control method for brown in/out control performed by an IC controller in the embodiment of this application can be applied to any scenario in which a supply voltage needs to be converted.

Figure 1:
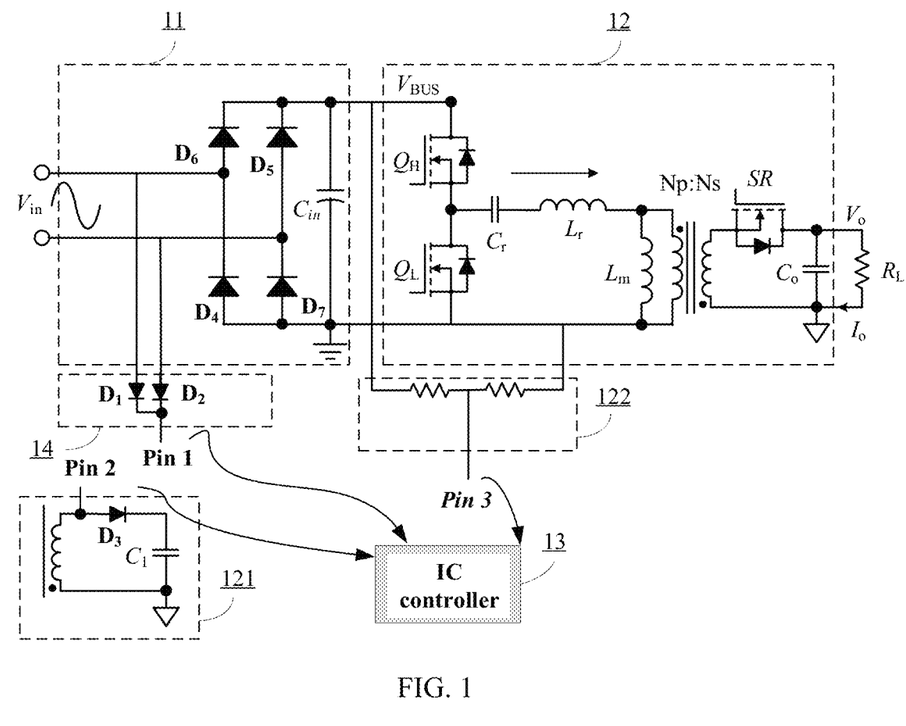
FIG. 1 is a schematic diagram of a power switching converter for detecting a working voltage of a direct current bus to perform brown in/out control according to a first solution.

FIG. 1 is a schematic diagram of a power switching converter for detecting a working voltage of a direct current bus to perform brown in/out control according to a first solution. As shown in FIG. 1, the power switching converter includes an AC/DC conversion circuit 11, a switching conversion module 12, an IC controller 13, and a load $R_L$.

The AC/DC conversion circuit 11 is a full-wave rectifier structure, including a capacitor $C_{in}$, a diode $D_4$, a diode $D_5$, a diode $D_6$, and a diode $D_7$. The capacitor $C_{in}$ is denoted as a first capacitor, the diode $D_4$, the diode $D_5$, the diode $D_6$, and the diode $D_7$ are respectively denoted as a fourth diode, a fifth diode, a sixth diode, and a seventh diode. An anode of the diode $D_6$ is connected in series to a cathode of the diode $D_4$, and a first common node after the series connection is connected to a first input terminal of an alternating current power supply. An anode of the diode $D_5$ is connected in series to a cathode of the diode $D_7$, and a second common node after the series connection is connected to a second input terminal of the alternating current power supply. A cathode of the diode $D_6$ is coupled to a cathode of the capacitor $C_{in}$, after being connected in parallel to a cathode of the diode $D_5$. An anode of the diode $D_7$ is coupled to an anode of the capacitor $C_{in}$, and is grounded after being connected in parallel to an anode of the diode $D_4$. The first input terminal of the alternating current power supply may be a live wire L, and the second input terminal may be a neutral wire N. Alternatively, the first input terminal of the alternating current power supply may be a neutral wire N, and the second input terminal may be a live wire L. This is not specifically limited herein.

The AC/DC conversion circuit 11 converts a negative voltage component of an input alternating current voltage $V_{in}$ into a positive voltage by using the full-wave rectifier structure, and then rectifies the input alternating current voltage into a direct current pulse voltage, and then smoothens a waveform by using charging and discharging functions of the capacitor $C_{in}$, to rectify the alternating current voltage into a direct current voltage.

The switching conversion module 12 is an asymmetrical half-bridge (AHB) fly back structure, including a switching transistor $Q_L$, a switching transistor $Q_H$, a capacitor $C_r$, and a transformer T. In FIG. 1, the switching transistor $Q_L$ and the switching transistor are connected in series and coupled at both terminals of the AC/DC conversion circuit 11. A primary-side winding of the transformer T is connected in parallel at both terminals of the switching transistor $Q_L$ by using the capacitor $C_r$.

The transformer T may be equivalent to an excitation inductor $L_m$, a leakage inductor $L_r$, and an ideal transformer T'. The transformer T includes two secondary-side windings. In the figure, "." is used to indicate a dotted terminal of the primary-side winding $Z_p$, the first secondary-side winding $Z_s$, and the second secondary-side winding $Z_a$.

A first terminal of the secondary-side winding $Z_s$ is coupled to a source of the switching transistor SR, and a drain of the switching transistor SR is coupled to a first terminal of the capacitor $C_0$ and a first terminal of the load $R_L$. Alternatively, a diode may be used instead of the switching transistor SR. A second terminal of the capacitor $C_0$ and a second terminal of the load $R_L$ are coupled to a second terminal of the secondary-side winding $Z_s$ and are grounded. The capacitor $C_0$ may reduce a ripple of a first output voltage $V_0$ of the transformer T.

In a power module 14, a first terminal of the alternating current power supply is connected to an anode of a diode $D_1$, a second terminal of the alternating current power supply is connected to an anode of a diode $D_2$, and a common output terminal after a cathode of the diode $D_1$ and a cathode of the diode $D_2$ are connected in parallel, is a pin $Pin_1$.

The pin $Pin_1$ is connected to the IC controller 13, and may supply power to the IC controller 13. After the alternating current power supply is started, the IC controller 13 is powered on.

In the circuit shown in FIG. 1, the switching conversion module 12 further includes a monitoring circuit 122 and an auxiliary circuit 121. The IC controller 13 is connected to a pin Pin3 of the monitoring circuit 122, and the IC controller 13 may detect a direct current bus voltage $V_{bus}$ in the monitoring circuit 122, to output a control instruction to implement brown in/out function control.

For example, after the IC controller 13 is powered on, and when the switching conversion module 12 is still in a non-operating state, a voltage on the pin Pin3 detected by the IC controller 13 is the direct current bus voltage $V_{bus}$ of the switching conversion module 12. When the voltage on the pin PIN3 reaches or exceeds a voltage for normal operation, a control instruction is output, so that the switching transistor $Q_H$ is turned on, and a current increases in a clockwise direction indicated by an arrow in FIG. 1, and the switching conversion module 12 enters an operating state. When the IC controller 13 detects that the voltage $V_{bus}$ on the pin Pin3 is lower than the voltage for normal operation, a second control instruction is output, to turn off the switching transistor $Q_H$ and the switching transistor $Q_L$, to shut down operation of the circuit and implement a brown in/out function.

In the operating state, a function performed by the auxiliary circuit 121 may be auxiliary power supplying and implementation of a zero voltage switch (ZVS) function. The auxiliary circuit 121 includes the secondary-side winding Z, of the transformer T. A first terminal of the secondary-side winding $Z_a$ is coupled to an anode of the diode $D_3$. A cathode of the diode $D_3$ is coupled to a first terminal of the capacitor $C_1$. A second terminal of the capacitor $C_1$, is coupled to a second terminal of the secondary-side winding $Z_a$ and is grounded. A pin Pin2 is disposed at a common node between the anode of the diode $D_3$ and the first terminal of the secondary-side winding $Z_a$. Pin2 is connected to the IC controller 13 to provide auxiliary voltage detection and the zero voltage switch (ZVS) function for the IC controller 13. The ZVS function is to turn on a switching transistor when a voltage at both terminals of the switching transistor drops to 0 V. Through the ZVS function, turn-on loss of the switching transistor can be minimized.

A disadvantage of the first solution is that the additional monitoring circuit 122 needs to be added to implement brown in/out for an asymmetrical half-bridge fly back topological structure, to obtain the direct current bus voltage $V_{bus}$ of the switching conversion module 12. The IC controller 13 needs to detect the voltage on the pin Pin3 to obtain the direct current bus voltage $V_{bus}$, to output the control instruction to turn on or off the operation of the switching conversion module 12. Although the solution can implement the brown in/out function, system costs are increased.

An embodiment of this application provides a switching conversion circuit. For the asymmetrical half-bridge fly back topological structure of the switching conversion module 12, the pin $Pin_1$ is used as a first detection terminal, and the IC controller 13 is connected to the pin $Pin_1$. When it is determined, by detecting a voltage value of the pin $Pin_1$, that a current voltage reaches or exceeds a preset lowest input voltage value for entering normal operation, a first control instruction is output, to implement a control function of brown in. The pin Pin2 is used as a second detection terminal. When it is determined, by detecting a voltage value of the pin Pin2, that the current voltage is lower than a preset voltage value for exiting normal operation, a second control instruction is output, to implement a control function of brown out. The voltage value for exiting normal operation is less than the lowest input voltage value for entering normal operation, and a voltage difference between the two is not less than a specified threshold.

The switching conversion circuit provided in this embodiment of this application does not need to add the additional monitoring circuit 122 to detect the working voltage of the direct current bus in the switching conversion module 12, but time-division multiplexes the pin $Pin_1$ as the first detection terminal and time-division multiplexes the pin Pin2 as the second detection terminal, to implement the control function of brown in/out while performing functions such as power supplying and ZVS. This reduces a quantity of peripheral circuits and output terminals of the switching conversion module 12, reduces a quantity of pins detected by the IC controller 13, and reduces the system costs.

Figure 2:
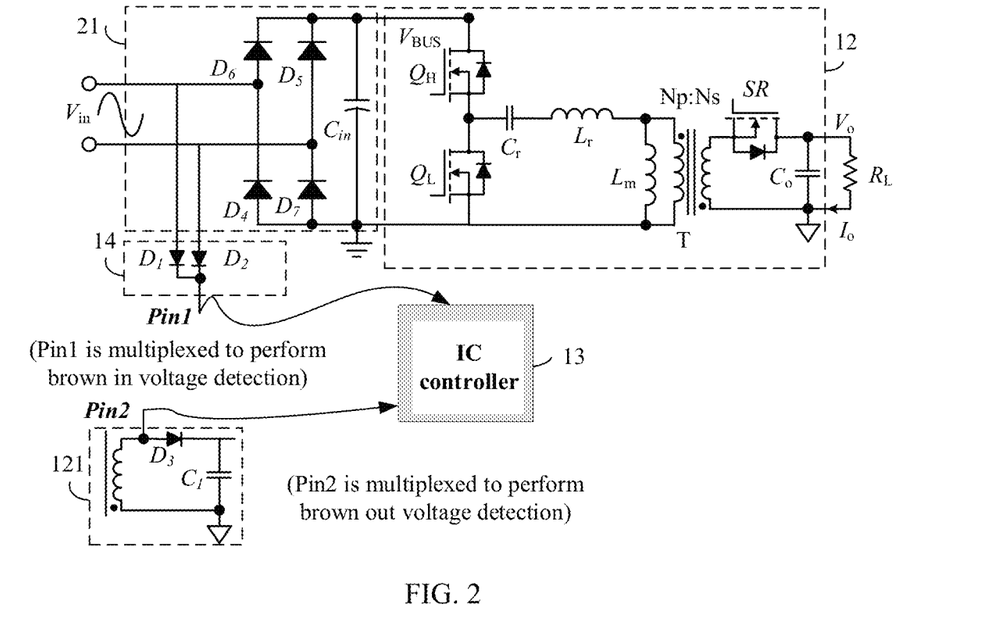
FIG. 2 is a schematic diagram of an AHB topological structure in which a transformer and a switching transistor $Q_L$ in a switching conversion circuit are connected in parallel according to an embodiment of this application.

The following describes a detection principle of a switching converter provided in this embodiment of this application with reference to FIG. 2.

FIG. 2 is a schematic diagram of a switching conversion circuit according to this embodiment of this application. As shown in FIG. 2, when detection is performed when the switching conversion module 12 stops operating, because there is basically no loss of the switching conversion module 12, it may be considered that a voltage value $V_{bus}$ of the direct current bus is equal to a value of an alternating current voltage $V_{in}$ input on an alternating current power supply side. Therefore, the value of the alternating current voltage $V_{in}$ may be used as a voltage required for entering normal operation by the switching conversion module 12.

For example, the pin $Pin_1$ may be used as the first detection terminal. The IC controller 13 detects a value of a voltage output by the pin $Pin_1$, outputs the first control instruction when the value of the voltage output by the pin $Pin_1$ reaches a preset lowest voltage required for entering normal operation, to turn on $Q_L$ and enable the switching conversion module 12 to enter the operating state, to implement the control function of brown in. The preset lowest input voltage value required for entering normal operation may be denoted as a first threshold. When the switching conversion module 12 stops operating, a voltage output by the pin $Pin_1$ is denoted as a first voltage, and a value of the first voltage is the value of the alternating current voltage $V_{in}$ input on the alternating current power supply side.

When the switching conversion module 12 has entered the operating state, the IC controller 13 performs zero voltage switch (ZVS) control on the switching conversion module by detecting a value of a second voltage output by the second detection terminal of the second secondary-side winding of the transformer. An implementation process of the ZVS is not significantly related to the patent of this application, and is not discussed herein.

After the switching conversion module 12 enters the operating state, the IC controller may turn off a first switching transistor and a second switching transistor based on the value of the voltage output by the first detection terminal, so that the switching conversion module 12 stops supplying power to the load. For example, the IC controller detects the value of the voltage output by the first detection terminal. When the value of the voltage output by the first detection terminal is less than the preset voltage value for exiting normal operation, the IC controller outputs the second control instruction, to turn off the first switching transistor and the second switching transistor. In this way, the control function of brown out is implemented. The preset voltage value for exiting normal operation may be denoted as a second threshold. The voltage output by the first detection terminal after the switching conversion module 12 enters the operating state is denoted as a third voltage.

However, after the switching conversion module 12 enters the operating state, because a main circuit of the switching conversion module 12 already operates, brown out control performed by using the value of the voltage output by the first detection terminal as a detection voltage is not accurate, and does not meet power supply requirements of some loads or chips with high safety or accuracy requirements.

The switching conversion circuit provided in this embodiment of this application may perform precise brown out control by monitoring a voltage output by the second secondary-side winding Z, of the transformer T.

In a possible implementation, the IC controller performs, based on a voltage output by the second detection terminal Pin2, brown out control while implementing the ZVS function, where the output voltage of the pin Pin2 may be used as a detection reference voltage for overvoltage and undervoltage protection, and after the voltage passes through a diode and a capacitor, low-voltage direct current power supplying may be further performed on a chip such as the IC controller.

In a process in which the IC controller 13 detects the value of the second voltage output by the pin PIN2, the IC controller 13 periodically turns on/off the switching transistor based on a switching period, so that the switching transistor $Q_H$ and the switching transistor $Q_L$ operate alternately. Therefore, in this process, the IC controller 13 can detect voltages $V_{2\_H}$ and $V_{2\_L}$ that are alternately changed and output by the pin Pin2, so that the value of the direct current bus voltage $V_{bus}$ can be obtained in each switching period.

In a possible implementation, the IC controller 13 detects the value of the voltage output by the pin Pin2, and obtains the value $V_{bus}$ of the direct current bus voltage in the switching conversion module 12 based on a first value $V_{2\_L}$ and a second value $V_{2\_H}$ that are output by the pin Pin2 in different states of the switching transistor and a ratio of a quantity of turns of the primary-side winding to a quantity of turns of the second secondary-side winding in the transformer T, to perform brown out control and stop the switching conversion module 12 from operating. The following analyzes a brown out control principle by using FIG. 3 and FIG. 4.

Figure 3:
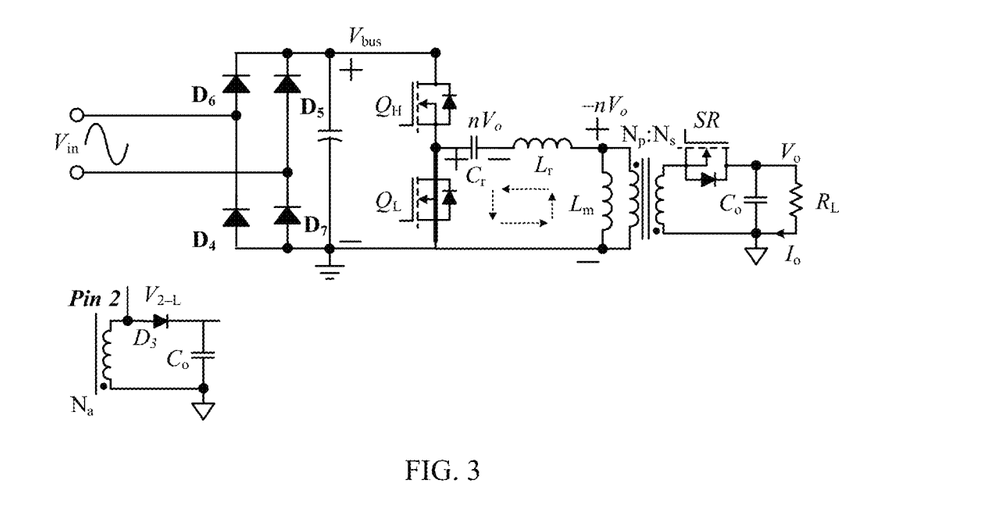

FIG. 3 is a state diagram of a switching conversion circuit according to an embodiment of this application when $Q_H$ is turned off and $Q_L$ is turned on. As shown in FIG. 3, a quantity of turns of a primary-side winding $Z_p$ of the transformer T is $N_p$, a quantity of turns of a secondary-side winding $Z_s$ is $N_s$, a quantity of turns of a secondary-side winding $Z_a$ is $N_a$, and a rating working voltage of a load $R_L$ is $V_0$. When $Q_H$ is turned off and $Q_L$ is turned on, after the circuit is stabilized, the capacitor $C_r$ is an equivalent voltage source, and a voltage at both terminals is $nV_o$, where n is a ratio of the quantity of turns of the primary-side winding $Z_p$ to the quantity of turns of the secondary-side winding $Z_s$, a voltage at both terminals of the primary-side winding $Z_p$ of the transformer T is $-nV_o$, and the voltage $V_{2\_L}$ output by the pin PIN2 is:

$$V_{2\_L}=nV_o*N_d/N_P \quad (1)$$

Figure 4:
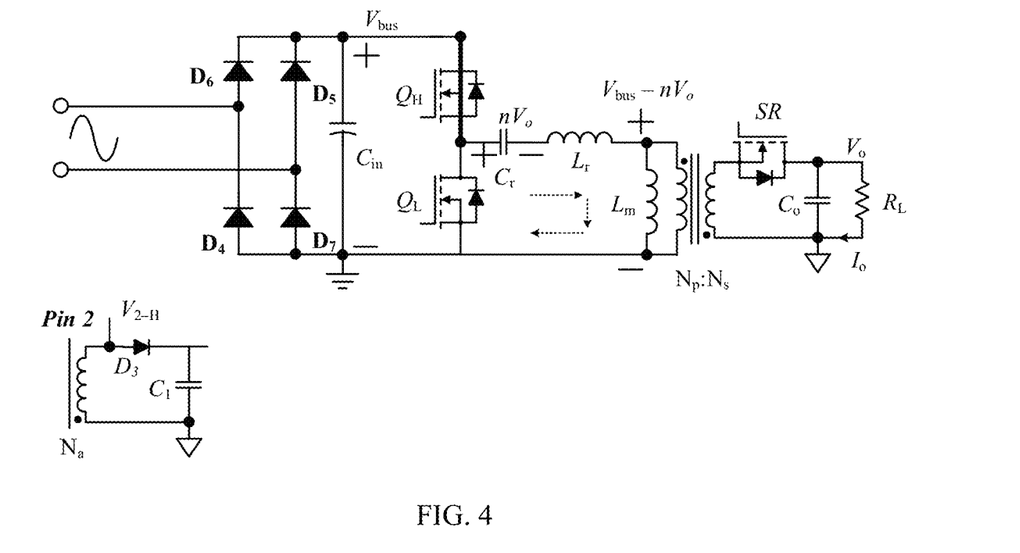
FIG. 4 is a state diagram of the AHB topological structure shown in FIG. 2 of this application when a switching transistor $Q_H$ is turned on and a switching transistor $Q_L$ is turned off.

FIG. 4 is a state diagram of a switching conversion circuit according to an embodiment of this application when $Q_H$ is turned on and $Q_L$ is turned off. As shown in FIG. 4, when $Q_H$ is turned on and $Q_L$ is turned off, after the circuit is stabilized, the direct current bus voltage of the switching conversion module 12 is $V_{bus}$, a voltage at both terminals of the resonance capacitor $C_r$ is $nV_0$, the voltage at both terminals of the primary-side winding $Z_p$ of the transformer T is $(V_{bus}-nV_0)$, and the voltage $V_{2\_H}$ output by the pin Pin2 is:

$$V_{2\_H}=-(V_{bus}-nV_0)*N_d/N_p \quad (2)$$

The direct current bus voltage $V_{bus}$ of the main circuit of the switching conversion module 12 may be solved by combining formula (1) and formula (2) as follows:

$$V_{bus}=(V_{2\_L}-V_{2\_H})*N_p/N_a \quad (3)$$

In conclusion, the IC controller 13 separately detects the voltage value $V_{2\_H}$ output by the pin Pin2 when $Q_H$ is turned on and $Q_L$ is turned off, and the voltage value $V_{2\_L}$ output by the pin Pin2 when $Q_H$ is turned off and $Q_L$ is turned on. Based on the values $V_{2\_H}$ and $V_{2\_L}$ as well as the ratio of the quantity of turns of the primary-side winding to the quantity of turns of the second secondary-side winding, the IC controller 13 determines the value of the direct current bus voltage $V_{bus}$ in the switching conversion module 12, and when the value of $V_{bus}$ is lower than the specified voltage value for exiting normal operation, outputs a second control instruction, to shut down operation of the circuit and implement the brown out control function.

The direct current bus voltage $V_{bus}$ of the switching conversion module 12 is obtained by time-division multiplexing the pin Pin2 as a brown out voltage detection terminal, which is a hysteresis process.

Figure 5:
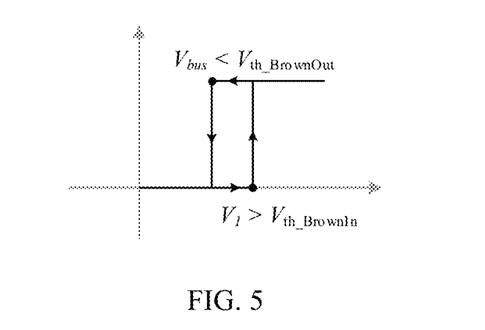
FIG. 5 is a schematic diagram of a hysteresis of a switching conversion circuit according to an embodiment of this application.

FIG. 5 is a schematic diagram of a hysteresis of a switching conversion circuit according to an embodiment of this application. As shown in FIG. 5, $V_{th\_brownin}$ is the lowest input voltage value for entering normal operation, that is, the first threshold. $V_{th\_brownout}$ is the voltage value for exiting normal operation, that is, the second threshold. $V_1$ is the voltage value of the pin Pin1. $V_{bus}$ is the direct current bus voltage value. A value of the second threshold $V_{th\_brownout}$ is less than a value of the first threshold $V_{th\_brownin}$, and a voltage difference between the value of the second threshold $V_{th\_brownout}$ and the value of the first threshold $V_{th\_brownin}$ is not less than a specified voltage difference threshold.

It can be learned from FIG. 5 that when a value of $V_1$ is greater than a value of $V_{th\_brownin}$ for normal operation, a normal operating state is entered, and when the value of $V_{bus}$ is less than the value of $V_{th\_brownout}$, the normal operating state is exited. Therefore, the switching conversion circuit provided in this embodiment of this application implements a control function of brown in/out, which is a hysteresis process.

In conclusion, the switching conversion circuit provided in this embodiment of this application includes a power module 21 and the switching conversion module 12. An output terminal of the power module 21 is coupled to the switching conversion module 12, and the power module 21 provides a direct current voltage to supply power to the switching conversion module 12. The output terminal of the power module 21 is coupled to the power module 14, and the power module 14 is used as a first detection unit. An output terminal $Pin_1$ of the power module 14 is connected to the IC controller 13 to supply power to the IC controller 13. In the switching conversion module 12, the switching transistor $Q_L$ is denoted as a first switching transistor, and the switching transistor $Q_H$ is denoted as a second switching transistor. The switching transistor $Q_L$ and the switching transistor $Q_H$ are connected in series and coupled at both terminals of the power module 21. The primary-side winding $Z_p$ of the transformer T is coupled at both terminals of the switching transistor $Q_L$ by using the first capacitor $C_r$, which may be denoted as an AHB topological structure of a lower half-bridge arm. The secondary-side winding $Z_i$ of the transformer is coupled at both terminals of the load by using the switching transistor SR. The auxiliary circuit 121 disposed based on the second secondary-side winding $Z_a$ of the transformer is used as a second detection unit. An output terminal Pin2 of the auxiliary circuit 121 is connected to the IC controller 13. The IC controller 13 performs brown in control on the switching conversion module 12 based on a voltage output by Pin1, so that the switching converter enters the operating state. The IC controller 13 performs brown out control on the switching conversion module 12 based on a voltage output by Pin2, so that the switching converter stops operating. Pin1 is denoted as a first detection terminal, and Pin2 is denoted as a second detection terminal. The voltage output by Pin1 is denoted as a first voltage, and the voltage output by Pin2 is denoted as a second voltage. A capacitor $C_{in}$ is denoted as a first capacitor, a capacitor $C_r$ is denoted as a second capacitor, a capacitor $C_1$ is denoted as a third capacitor, and a capacitor $C_0$ is denoted as a fourth capacitor.

In a possible implementation, the power module 21 may be an AC/DC converter, to rectify an alternating current voltage output by the alternating current power supply into a direct current voltage to supply power. The power module may alternatively be a direct current power supply, and includes at least one of the following apparatuses: an energy storage battery (such as a nickel-cadmium battery, a nickel-metal hydride battery, a lithium ion battery, and a lithium polymer battery), a solar cell, another direct current/direct current (DC/DC) converter, such as a buck converter, a boost converter, and a buck-boost converter, to directly output a direct current voltage to supply power.

In a possible implementation, the IC controller 13 detects a value of the first voltage output by Pin1 before the switching conversion module enters the operating state; and when the value of the first voltage reaches a first threshold, outputs a first control instruction, to turn on the switching transistor $Q_L$, so that the switching conversion module 12 enters the operating state to supply power to the load. The first threshold is a preset lowest input voltage value for entering normal operation. The value of the first voltage is a value of an alternating current input voltage, and a peak value of the first voltage may be used as a reference value.

In a possible implementation, the IC controller 13 detects, in an operating state in which the switching transistor $Q_L$ is turned on and the switching transistor $Q_H$ is turned off, a value of the second voltage output by Pin2 to obtain a first value; detects, in an operating state in which the switching transistor $Q_L$ is turned off and the switching transistor $Q_H$ is turned on, a value of the second voltage output by Pin2 to obtain a second value; obtains a value of a direct current bus voltage in an asymmetrical half-bridge flyback circuit based on the first value, the second value, and a ratio of a quantity of turns of the primary-side winding to a quantity of turns of the second secondary-side winding; and when the value of the direct current bus voltage is less than a second threshold, outputs a second control instruction, to turn off the switching transistor $Q_L$ and the switching transistor $Q_H$, where the second threshold is a specified voltage value for exiting normal operation.

The switching conversion circuit provided in this embodiment of this application is not limited to an AHB topological structure in which the transformer and the switching transistor $Q_L$ are coupled in parallel, and is also applicable to an AHB topological structure in which the transformer and the switching transistor $Q_H$ are coupled in parallel. The AHB structure in which the transformer and the switching transistor $Q_H$ are coupled in parallel may be denoted as an AHB topological structure of an upper half-bridge arm.

Figure 6:
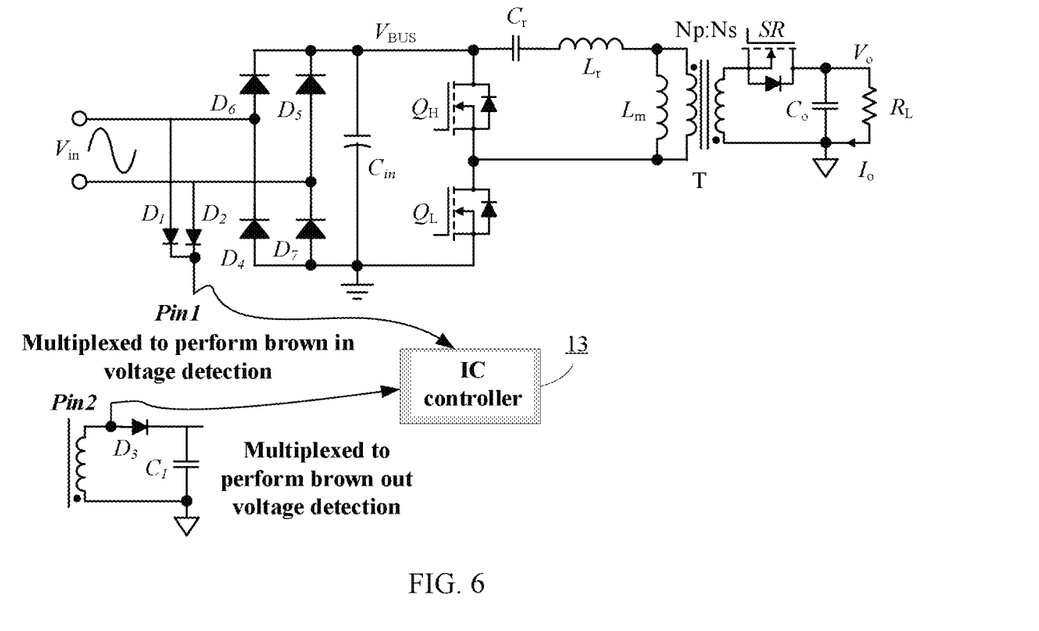
FIG. 6 is a schematic diagram of an AHB topological structure in which a transformer and a switching transistor $Q_H$ in a switching conversion circuit are connected in parallel according to an embodiment of this application.

FIG. 6 is a circuit diagram of an AHB topological structure of an upper half-bridge arm in a switching conversion circuit according to an embodiment of this application. As shown in FIG. 6, the primary-side winding of the transformer is coupled at both terminals of the switching transistor $Q_H$ by using the capacitor $C_r$. The IC controller 13 detects a value of the first voltage output by $Pin_1$ before the switching conversion module enters the operating state; and when the value of the first voltage reaches the first threshold, outputs a first control instruction, to turn on the switching transistor $Q_H$, so that the switching conversion module 12 enters the operating state to supply power to the load. The IC controller 13 detects, in an operating state in which the switching transistor $Q_L$ is turned off and the switching transistor $Q_H$ is turned on, a value of the second voltage output by Pin2 to obtain a first value; detects, in an operating state in which the switching transistor $Q_L$ is turned on and the switching transistor $Q_H$ is turned off, a value of the second voltage output by Pin2 to obtain a second value; obtains a value of the direct current bus voltage in the asymmetrical half-bridge flyback circuit based on the first value, the second value, and the ratio of the quantity of turns of the primary-side winding to the quantity of turns of the second secondary-side winding; and when the value of the direct current bus voltage is less than the second threshold, outputs a second control instruction, to turn off the switching transistor $Q_L$ and the switching transistor $Q_H$.

Figure 7:
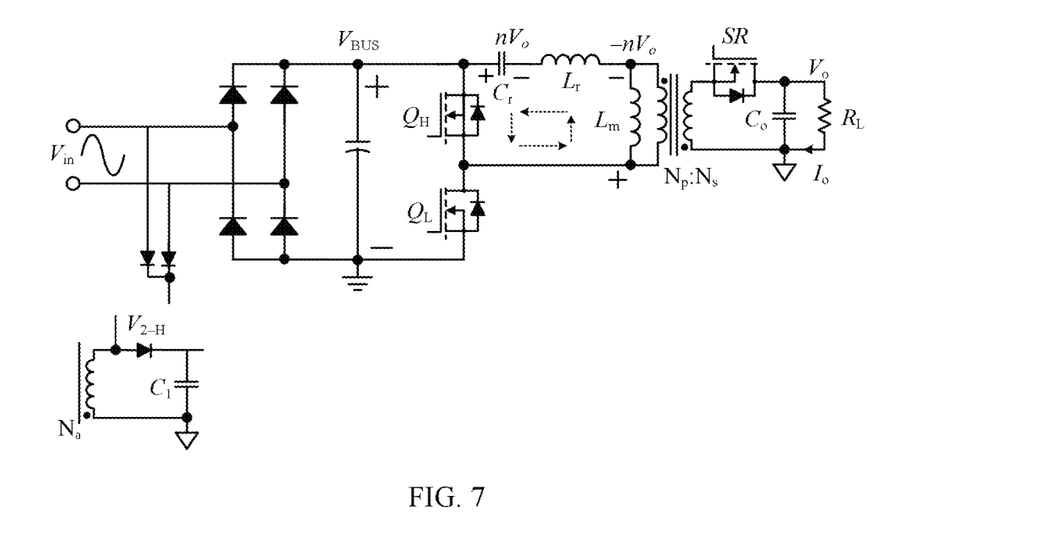
FIG. 7 is a state diagram of a detection circuit with the AHB topological structure in FIG. 6 when a switching transistor $Q_H$ is turned on and a switching transistor $Q_L$ is turned off.

FIG. 7 is a state diagram of a detection circuit of an AHB structure of an upper half-bridge arm when $Q_H$ is turned on and $Q_L$ is turned off. As shown in FIG. 7, when $Q_H$ is turned on and $Q_L$ is turned off, after the circuit is stabilized, the capacitor $C_r$ is an equivalent power supply, and a voltage at both terminals is $nV_o$, a voltage at both terminals of the primary-side winding $Z_p$ of the transformer T is $-nV_o$, and the voltage $V_{2\_H}$ of the pin PIN2 at this time is:

$$V_{2\_H}=nV_o*N_a/N_p \tag{4}$$

Figure 8:
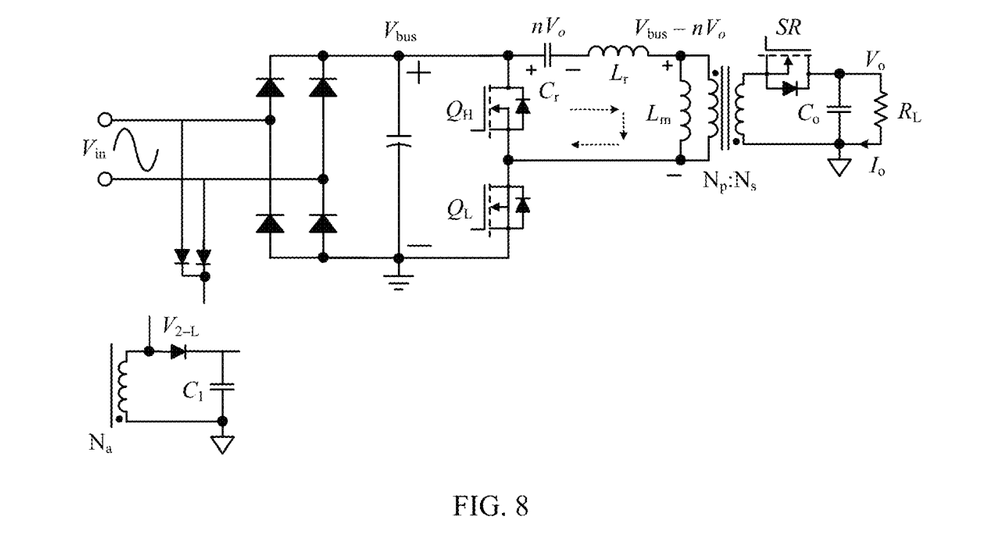

FIG. 8 is a state diagram of a detection circuit of an AHB structure of an upper half-bridge arm when $Q_H$ is turned off and $Q_L$ is turned on. As shown in FIG. 8, when $Q_H$ is turned off and $Q_L$ is turned on, after the circuit is stabilized, the direct current bus voltage of the main circuit of the switching conversion module 12 is $V_{bus}$, a voltage at both terminals of the resonance capacitor $C_r$ is $nV_0$, the voltage at both terminals of the primary-side winding $Z_p$ of the transformer T is $(V_{bus}-nV_0)$, and the voltage $V_{2\_L}$ of the pin PIN2 is:

$$V_{2\_L}=-(V_{bus}-nV_0)*N_a/N_p \tag{5}$$

The direct current bus $V_{bus}$ of the main circuit of the switching conversion module 12 may be solved by combining formula (4) and formula (5) as follows;

$$V_{bus}=(V_{2\_H}-V_{2\_L})*N_p/N_a \tag{6}$$

In conclusion, in the detection circuit with the AHB structure of the upper half-bridge arm, the IC controller 13 detects the voltage value $V_{2\_H}$ of the pin Pin2 when $Q_H$ is turned on and $Q_L$ is turned off, and the voltage value $V_{2\_L}$ of the pin Pin2 when $Q_H$ is turned off and $Q_L$ is turned on; determines a value of the direct current bus voltage $V_{bus}$ of the main circuit of the switching conversion module 12 based on a difference between $V_{2\_H}$ and $V_{2\_L}$; and when a value of $V_{bus}$ is less than the second threshold, turns off $Q_H$ and $Q_L$, to stop supplying power to the load and implement the control function of brown out.

Figure 9:
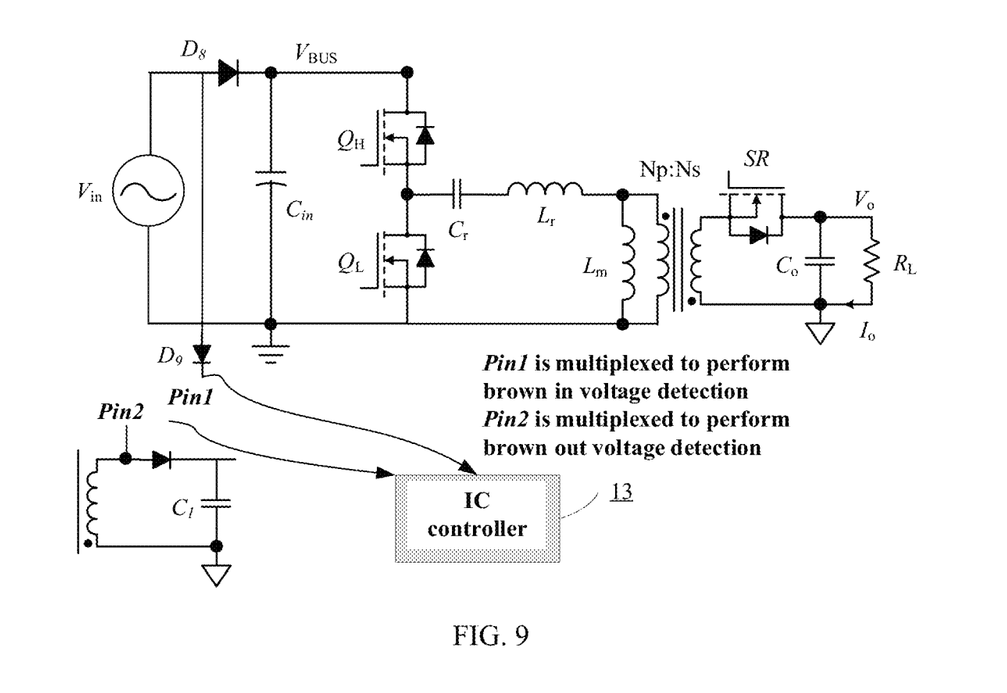
FIG. 9 is a half-wave rectifier structure of an alternating current power supply in a switching conversion circuit according to an embodiment of this application.

In a power switching conversion circuit according to embodiments of this application, the AC/DC conversion circuit 11 may alternatively be a half-wave rectifier structure. FIG. 9 is a half-wave rectifier structure of an alternating current power supply in a switching conversion circuit according to an embodiment of this application. As shown in FIG. 9, the half-wave rectifier structure of the AC/DC conversion circuit 11 includes a first capacitor $C_{in}$, and a diode $D_8$. An anode of the diode $D_8$ is coupled to a first input terminal of the alternating current power supply, and a cathode of the diode $D_8$ is coupled to a cathode of the capacitor $C_{in}$. An anode of the capacitor $C_{in}$, is coupled to a second input terminal of the alternating current power supply and grounded. The AC/DC conversion circuit 11 rectifies an input alternating current voltage $V_{in}$ into a direct current pulse voltage by using the half-wave rectifier circuit of the diode, and smoothens a waveform by using charging and discharging functions of the capacitor $C_{in}$, to rectify the alternating current voltage into a direct current voltage. The IC controller 13 detects a value of the first voltage output by Pin1 before the switching conversion module enters the operating state; and when the value of the first voltage reaches the first threshold, outputs a first control instruction, to turn on the switching transistor $Q_L$, so that the switching conversion module 12 enters the operating state to supply power to the load. The IC controller 13 detects, in an operating state in which the switching transistor $Q_L$ is turned off and the switching transistor $Q_H$ is turned on, a value of the second voltage output by Pin2 to obtain a first value; detects, in an operating state in which the switching transistor $Q_L$ is turned on and the switching transistor $Q_H$ is turned off, a value of the second voltage output by Pin2 to obtain a second value; obtains a value of the direct current bus voltage in the asymmetrical half-bridge fly back circuit based on the first value, the second value, and the ratio of the quantity of turns of the primary-side winding to the quantity of turns of the second secondary-side winding; and when the value of the direct current bus voltage is less than the second threshold, outputs a second control instruction, to turn off the switching transistor $Q_L$ and the switching transistor $Q_H$. Control principles of the switching conversion module 12 and brown in/out are the same as those in the foregoing implementations, and are not repeated herein.

An embodiment of this application provides a control method for a switching conversion circuit. The method is implemented based on the switching conversion circuit in one of the foregoing embodiments, and is performed by an IC controller 13.

When a primary-side winding of a transformer is coupled to both terminals of a switching transistor $Q_L$ by using a first capacitor, the IC controller 13 turns on the switching transistor $Q_L$ or a switching transistor $Q_H$ based on a value of a first voltage output by a first detection terminal, so that a switching conversion module 12 enters an operating state to supply power to a load; and turns off the switching transistor $Q_L$ and the switching transistor $Q_H$ based on a value of a second voltage output by a second detection terminal, so that the switching conversion module 12 stops supplying power to the load.

In a possible implementation, before a switching converter enters the operating state, the IC controller 13 detects a value of the first voltage output by the first detection terminal; when the value of the first voltage reaches a first threshold, outputs a first control instruction, so that the switching converter enters the operating state to supply power to the load. The first threshold is a preset lowest input voltage value for entering normal operation. The first voltage is a value of an alternating current input voltage.

In a possible implementation, the IC controller 13 detects, in an operating state in which the switching transistor $Q_L$ is turned on and the switching transistor $Q_H$ is turned off, a value of the second voltage output by the second detection terminal, to obtain a first value; detects, in an operating state in which the switching transistor $Q_L$ is turned off and the switching transistor $Q_H$ is turned on, a value of the second voltage output by the second detection terminal, to obtain a second value; obtains a value of a direct current bus voltage in an asymmetrical half-bridge flyback circuit based on the first value, the second value, and a ratio of a quantity of turns of the primary-side winding to a quantity of turns of a second secondary-side winding; when the value of the direct current bus voltage is less than a second threshold, outputs a second control instruction, to turn off the switching transistor $Q_L$ and the switching transistor $Q_H$, where the second threshold is a specified voltage value for exiting normal operation.

In a possible implementation, when the primary-side winding of the transformer in the switching conversion module 12 is coupled at both terminals of the switching transistor $Q_H$ by using the first capacitor, before the switching conversion module 12 enters the operating state, the IC controller 13 detects a value of the first voltage output by the first detection terminal; when the value of the first voltage reaches a first threshold, outputs a first control instruction, to turn on the switching transistor $Q_H$, so that the switching conversion module 12 enters the operating state to supply power to the load.

In a possible implementation, when the primary-side winding of the transformer in the switching conversion module 12 is coupled at both terminals of the switching transistor $Q_H$ by using the first capacitor, the IC controller 13 detects, in an operating state in which the switching transistor $Q_L$ is turned off and the switching transistor $Q_H$ is turned on, a value of the second voltage output by the second detection terminal, to obtain a first value; detects, in an operating state in which the switching transistor $Q_L$ is turned on and the switching transistor $Q_H$ is turned off, a value of the second voltage output by the second detection terminal, to obtain a second value; obtains a value of a direct current bus voltage in an asymmetrical half-bridge fly back circuit based on the first value, the second value, and a ratio of a quantity of turns of the primary-side winding to a quantity of turns of the second secondary-side winding; and when the value of the direct current bus voltage is less than a second threshold, outputs a second control instruction, to turn off the switching transistor $Q_L$ and the switching transistor $Q_H$.

In a possible implementation, the method further includes performing zero voltage switch control on the switching conversion module by using the value of the second voltage output by the second detection terminal.

The alternating current power supply described in embodiments of this application may be a single-phase alternating current voltage of a power grid or an alternating current voltage output by another alternating current power supply.

The load described in embodiments of this application may be a mobile phone terminal, an energy storage battery, another DC/DC converter, a DC/AC converter, and/or the like.

In a switching conversion circuit according to embodiments of this application, that a switching transistor $Q_H$ and a switching transistor $Q_L$ are metal-oxide-semiconductor field-effect transistors (MOSFETs) is used as an example for description. It should be understood that each switching transistor may alternatively be another semiconductor device, such as an insulated gate bipolar transistor (IGBT).

The IC controller described in this application may be a central processing unit (CPU), another general purpose processor, a digital signal processor (DSP), an application-specific integrated circuit (ASIC), a field-programmable gate array (FPGA) or another programmable logic device, a discrete gate or transistor logic device, a discrete hardware component, or the like.

For example, the load may be a mobile phone terminal, and the alternating current power supply may be a power grid alternating current voltage. The AC/DC converter (including an uncontrolled rectifier and a DC/DC converter) converts an input alternating current voltage of the power grid into a direct current voltage. The IC controller monitors a working voltage in the circuit to output a control instruction, and performs brown in/out control on a power switch controller, to convert the direct current voltage output by the AC/DC converter into a specified direct current voltage value, for example, 5 V and 10 V.

For example, the AC/DC converter (including an uncontrolled rectifier and a DC/DC converter) and the IC controller may be disposed in a power adapter.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of the embodiments of this application.

In addition, aspects or features in embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application.

What is claimed is:

1. A switching conversion circuit, comprising:
   a power circuit configured to supply power to the switching conversion circuit and an integrated circuit (IC) controller;
   a first detection circuit; and
   a second detection circuit;
   wherein the switching conversion circuit is an asymmetrical half-bridge (AHB) flyback structure, and comprises a first switching transistor, a second switching transistor, a first capacitor, and a transformer;
wherein the first switching transistor and the second switching transistor are connected in series at both terminals of the power circuit;
wherein a primary-side winding of the transformer is coupled at both terminals of the first switching transistor using the first capacitor;
wherein the transformer comprises a first secondary-side winding and a second secondary-side winding, and the first secondary-side winding of the transformer is coupled to a load;
wherein the IC controller turns on the first switching transistor or the second switching transistor based on a value of a first voltage, so that the switching conversion circuit enters an operating state to supply power to the load, and wherein the IC controller turns off the first switching transistor and the second switching transistor based on a value of a second voltage, so that the switching conversion circuit stops supplying power to the load, wherein the value of the first voltage is a value of a voltage input from an alternating current power supply side, and the value of the second voltage is a value of a voltage output by the second secondary-side winding of the transformer;
wherein the first detection circuit is coupled between a first input terminal and a second input terminal of the power circuit, wherein a first detection terminal of the first detection circuit is coupled to the IC controller and is configured to detect the first voltage and a third voltage;
wherein the second detection circuit is coupled at both terminals of the second secondary-side winding of the transformer, wherein a second detection terminal of the second detection circuit is coupled to the IC controller and is configured to detect the second voltage; and
wherein the value of the second voltage comprises a first value and a second value, and the IC controller is configured to:
detect, in an operating state in which the first switching transistor is turned on and the second switching transistor is turned off, a value of the second voltage output by the second detection terminal to obtain the first value;
detect, in an operating state in which the first switching transistor is turned off and the second switching transistor is turned on, a value of the second voltage output by the second detection terminal to obtain the second value;
obtain a value of a direct current bus voltage in the AHB fly back structure based on the first value, the second value, and a ratio of a quantity of turns of the primary-side winding to a quantity of turns of the second secondary-side winding; and
in response to the value of the direct current bus voltage being less than a second threshold, output a second control instruction, to turn off the first switching transistor and the second switching transistor, wherein the second threshold is a specified voltage value for exiting normal operation.

2. The switching conversion circuit according to claim 1, wherein the IC controller is configured to:
before the switching conversion circuit enters the operating state, detect a value of the first voltage output by the first detection terminal; and
in response to the value of the first voltage reaching a first threshold, output a first control instruction, to turn on the first switching transistor or the second switching transistor, so that the switching conversion circuit enters the operating state to supply power to the load, wherein the first threshold is a specified lowest input voltage value for entering normal operation.

3. The switching conversion circuit according to claim 1, wherein after the switching conversion circuit enters the operating state, the IC controller is configured to turn off the first switching transistor and the second switching transistor based on a value of the third voltage, so that the switching conversion circuit stops supplying power to the load.

4. The switching conversion circuit according to claim 3, wherein the IC controller is configured to:
detect a value of the third voltage output by the first detection terminal; and
in response to the value of the third voltage being less than a second threshold, output a second control instruction, to turn off the first switching transistor and the second switching transistor, wherein the second threshold is a specified voltage value for exiting normal operation.

5. The switching conversion circuit according to claim 1, wherein the second detection circuit comprises the second secondary-side winding of the transformer;
wherein a first terminal of the second secondary-side winding is coupled to an anode of a third diode;
wherein a cathode of the third diode is coupled to a first terminal of a third capacitor, and a second terminal of the third capacitor is coupled to a second terminal of the second secondary-side winding and is grounded; and
wherein the IC controller is coupled at the second detection terminal between the first terminal of the second secondary-side winding and the anode of the third diode.

6. The switching conversion circuit according to claim 1, wherein the IC controller is further configured to perform zero voltage switch (ZVS) control on the switching conversion circuit by detecting the value of the second voltage output by the second detection terminal.

7. The switching conversion circuit according to claim 1, wherein the power circuit comprises an alternating current/direct current (AC/DC) conversion circuit, and the AC/DC conversion circuit is a full-wave rectifier structure or a half-wave rectifier structure.

8. The switching conversion circuit according to claim 7, wherein the AC/DC conversion circuit is a full-wave rectifier structure, and comprises a first capacitor, a fourth diode, a fifth diode, a sixth diode, and a seventh diode;
wherein a cathode of the fourth diode is connected in series to an anode of the sixth diode, and a first common node after the series connection is connected to a first input terminal of an alternating current power supply;
wherein a cathode of the seventh diode is connected in series to an anode of the fifth diode, and a second common node after the series connection is connected to a second input terminal of the alternating current power supply;
wherein a cathode of the fifth diode is coupled to a cathode of the first capacitor after being connected in parallel to a cathode of the sixth diode; and
wherein an anode of the fourth diode is coupled to an anode of the first capacitor and is grounded after being connected in parallel to an anode of the seventh diode.

9. The switching conversion circuit according to claim 8, wherein the first detection circuit comprises a first diode and a second diode;

wherein an anode of the first diode is coupled to the first input terminal of the power circuit;

wherein an anode of the second diode is coupled to the second input terminal of the power circuit; and wherein a first detection terminal after a cathode of the first diode and a cathode of the second diode are connected in parallel, wherein the first detection terminal is coupled to the IC controller.

10. A control method implemented based on a switching conversion circuit, wherein the switching conversion circuit comprises at least a power circuit configured to supply power to the switching conversion circuit and an integrated circuit (IC) controller;

wherein the switching conversion circuit is an asymmetrical half-bridge fly back structure, and comprises at least a first switching transistor, a second switching transistor, a first capacitor, and a transformer;

wherein the first switching transistor and the second switching transistor are connected in series at both terminals of the power circuit;

wherein a primary-side winding of the transformer is coupled at both terminals of the first switching transistor by using the first capacitor;

wherein the transformer comprises a first secondary-side winding and a second secondary-side winding, and the first secondary-side winding of the transformer is coupled to a load; and wherein the method comprises;

turning on the first switching transistor or the second switching transistor based on a value of a first voltage, so that the switching conversion circuit enters an operating state to supply power to the load, wherein the value of the first voltage is a value of a voltage input from an alternating current power supply side; and turning off the first switching transistor and the second switching transistor based on a value of a second voltage, so that the switching conversion circuit stops supplying power to the load, wherein the value of the second voltage is a value of a voltage output by the second secondary-side winding of the transformer;

wherein the value of the second voltage comprises a first value and a second value, and the turning off the first switching transistor and the second switching transistor based on the value of the second voltage, so that the switching conversion circuit stops supplying power to the load comprises;

detecting, in an operating state in which the first switching transistor is turned on and the second switching transistor is turned off, a value of the second voltage to obtain the first value;

detecting, in an operating state in which the first switching transistor is turned off and the second switching transistor is turned on, a value of the second voltage to obtain the second value;

obtaining a value of a direct current bus voltage in the asymmetrical half-bridge fly back structure based on the first value, the second value, and a ratio of a quantity of turns of the primary-side winding to a quantity of turns of the second secondary-side winding; and in response to the value of the direct current bus voltage being less than a second threshold, outputting a second control instruction, to turn off the first switching transistor and the second switching transistor, wherein the second threshold is a specified voltage value for exiting normal operation.

11. The control method for the switching conversion circuit according to claim 10, wherein the turning on the first switching transistor or the second switching transistor based on the value of the first voltage, so that the switching conversion circuit enters the operating state to supply power to the load comprises;

before the switching conversion circuit enters the operating state, detecting the value of the first voltage; and in response to the value of the first voltage reaching a first threshold, outputting a first control instruction, to turn on the first switching transistor or the second switching transistor, so that the switching conversion circuit enters the operating state to supply power to the load, wherein the first threshold is a specified lowest input voltage value for entering normal operation.

12. The control method for the switching conversion circuit according to claim 10, wherein after the switching conversion circuit enters the operating state, the first switching transistor and the second switching transistor are turned off based on a value of a third voltage, so that the switching conversion circuit stops supplying power to the load; and wherein the third voltage is a value of a voltage input from the alternating current power supply side.

13. The control method for the switching conversion circuit according to claim 12, wherein the value of the third voltage is detected;

wherein in response to the value of the third voltage being less than a second threshold, a second control instruction is output to turn off the first switching transistor and the second switching transistor; and wherein the second threshold is a specified voltage value for exiting normal operation.

* * * * *

UNITED STATES PATENT AND TRADEMARK OFFICE
CERTIFICATE OF CORRECTION

| | |
|---|---|
| PATENT NO. | : 12,101,033 B2 |
| APPLICATION NO. | : 17/853479 |
| DATED | : September 24, 2024 |
| INVENTOR(S) | : Wang et al. |

It is certified that error appears in the above-identified patent and that said Letters Patent is hereby corrected as shown below:

In the Claims

Claim 1: Column 19, Line 51: "AHB fly back structure based on the first value, the" should read as -- AHB flyback structure based on the first value, the --.

Claim 10: Column 21, Line 14: "cal half-bridge fly back structure, and comprises at least" should read as -- cal half-bridge flyback structure, and comprises at least --.

Claim 10: Column 21, Line 27: "wherein the method comprises;" should read as -- wherein the method comprises: --.

Claim 10: Column 21, Line 47: "the load comprises;" should read as -- the load comprises: --.

Claim 10: Column 22, Line 6: "asymmetrical half-bridge fly back structure based on" should read as -- asymmetrical half-bridge flyback structure based on --.

Claim 11: Column 22, Line 22: "to the load comprises;" should read as -- to the load comprises: --.

Signed and Sealed this
Twentieth Day of May, 2025

Coke Morgan Stewart
*Acting Director of the United States Patent and Trademark Office*